United States Patent [19]

Carter et al.

[11] Patent Number: 5,038,319

[45] Date of Patent: Aug. 6, 1991

[54] SYSTEM FOR RECORDING AND REMOTELY ACCESSING OPERATING DATA IN A REPRODUCTION MACHINE

[75] Inventors: Jeff C. Carter, Fairport; Robert S. Westfall, Rochester; Robert M. VanDuyn, Rochester; Joseph L. Filion, Rochester; Dale T. Platteter; Douglas T. Rabjohns, both of Fairport; Vincent A. Capaccio, Ontario; John R. Hill, Jr., Rochester, all of N.Y.

[73] Assignee: Xerox Corporation, Stamford, Conn.

[21] Appl. No.: 342,131

[22] Filed: Apr. 24, 1989

[51] Int. Cl.⁵ ............................................. G06F 11/34
[52] U.S. Cl. ................... 364/900; 364/944.9; 364/945.3; 364/945.4; 364/945.7; 364/957.8; 364/962
[58] Field of Search ............... 364/200, 300, 900, 464; 371/16

[56] References Cited

U.S. PATENT DOCUMENTS

| | | | |
|---|---|---|---|
| 3,838,260 | 9/1974 | Nelson | 371/16.5 |
| 3,893,175 | 7/1975 | Solomon | 364/464.01 |
| 4,062,061 | 12/1977 | Batchelor et al. | 364/900 |
| 4,133,477 | 1/1979 | Marino et al. | 235/304 |
| 4,253,183 | 2/1981 | Taylor et al. | 371/16 |
| 4,322,813 | 3/1982 | Howard et al. | 364/900 |
| 4,463,418 | 7/1984 | O'Quin, II et al. | 364/200 |
| 4,477,901 | 10/1984 | Braband et al. | 371/15 |
| 4,493,035 | 1/1985 | MacGregor et al. | 364/200 |
| 4,499,581 | 2/1985 | Miazga et al. | 371/20 |
| 4,514,846 | 4/1985 | Federico et al. | 364/200 |
| 4,554,662 | 11/1985 | Suzuki et al. | 371/20 |
| 4,586,147 | 4/1986 | Tadokoro | 364/550 |
| 4,628,511 | 12/1986 | Stitzlein et al. | 371/22 |
| 4,695,946 | 9/1987 | Andreasen et al. | 364/200 |
| 4,739,366 | 4/1988 | Braswell et al. | 355/14 SH |
| 4,835,685 | 5/1989 | Kun | 364/200 |
| 4,835,736 | 5/1989 | Easterday | 364/900 |
| 4,866,661 | 9/1989 | DePrins | 364/900 |

FOREIGN PATENT DOCUMENTS 58-160960 9/1983 Japan .

OTHER PUBLICATIONS

Xerox Software Release Document, "System Crash Diagnostics", 11/09/84, pp. 3 & 24-25, Section 5.

Primary Examiner—Gareth D. Shaw
Assistant Examiner—John C. Loons
Attorney, Agent, or Firm—Frederick E. McMullen

[57] ABSTRACT

System for recording and remotely accessing certain operating data in an electrostatographic reproduction machine for use in analyzing machine faults and software crashes, with transfer of the data to a remote service site either by floppy disk or telecommunications line.

12 Claims, 6 Drawing Sheets

SYSTEM FOR RECORDING AND REMOTELY ACCESSING OPERATING DATA IN A REPRODUCTION MACHINE

A portion of the disclosure of this patent document contains material which is subject to Copyright protection. The Copyright owner has no objection to the facsimile reproduction by anyone of the patent document or the patent disclosure, as it appears in the Patent and Trademark Office patent file or records, but otherwise reserves all Copyright rights whatsoever.

The invention relates to reproduction machines, and more particularly, to a system for recording and remotely accessing machine data.

Modern day reproduction machines such as printers and copiers utilize a software based operating system to perform essential machine functions and implement the various printing and copying jobs of which the machine is capable. However, software, particularly that used in high speed multi-function machines, is subject to various problems and faults. Additional problems also arise with the machine hardware which in machines of this type is extremely complex and sophisticated. Hardware and software problems that occur typically happen at a low non-periodic rate and thus are very difficult to replicate when servicing the machine and therefore difficult to satisfactorily resolve. However, many of these problems are identified by people not technically trained to diagnose and service machines of this type, typically the customer. Because of this, it is important for the servicing organization to be able to access key machine operating information, and particularly information reflecting on the performance of the machine control system. Where information is available, a post problem event evaluation can be done by trained experts to determine the root cause of the problem and make the necessary changes that will not only correct the problem but prevent reoccurrence of the problem in the future.

In this respect, it can be understood that to implement access of the type described above, there needs to be a way to reliably gather and save key machine operating information and data. This is tempered by the realization that memory cost and space does not however allow the luxury of retaining each and every event that transpires in the machine from one service call to the next. Ancillary to the problem of gathering and saving important operating data, there must also be a way to transmit the data, or that part of the data which is necessary to analyze and fix the problem, to the proper people reliably, quickly, and at the lowest possible cost.

In the prior art, U.S. Pat. No. 4,628,511 to Stitzlein et al. discloses an apparatus for analyzing computer channel failures in which pre and post failure events are recorded and later used to analyze the faulted channel signal activity, with a printer used to provide a hard copy of the information. U.S. Pat. No. 4,493,035 to MacGregor et al discloses a system in which essential information regarding the internal state of a computer is saved on an external memory in the event a fault is detected while executing an instruction routine. On correction of the fault, the stored data is retrieved and the instruction executed. And, U.S. Pat. No. 4,253,183 to Taylor et al discloses a processor composed of plural replaceable units, each with a snapshot circuit for storing signals on command which may later be used for maintenance and fault diagnoses.

Further, U.S. Pat. No. 4,322,813 to Howard et al discloses a data log retrieval system for a copying machine in which operational data and error data are logged and retrieved during the maintenance mode. U.S. Pat. No. 4,586,147 to Tadokoro discloses a system in which a non-volatile memory stores the latest failure information of a printer such as number of paper jams, toner supply, etc., while U.S. Pat. No. 4,739,366 to Braswell et al discloses a real-time diagnostic system for copiers in which various sensors detect the passage of sheets through the feeder. Data representative of the operating time is stored in memory with the data being moved to a non-volatile memory on detection of a fault. U.S. Pat. No. 4,062,061 to Batchelor discloses an error log for electrostatographic machines where, upon detection of a fault, the fault is identified on a display, with the fault information stored in memory for future reference. U.S. Pat. No. 4,133,477 to Marino et al discloses a reproduction machine wherein on detection of a fault, the fault is displayed and recorded in memory for future reference. U.S. Pat. No. 4,499,581 to Miazga et al discloses a self-testing system for reproduction machines in which any fault found is displayed on a display panel, while U.S. Pat. No. 4,554,662 to Suzuki et al discloses an electronic copier having a test mode for testing various detectors located through the copier with the results displayed on a display device. And, U.S. Pat. No. 4,477,901 to Braband et al discloses a diagnostic system that monitors machine events and in the event a fault is detected, the particular subsystem faulted and the last completed event which caused the fault displayed, while Japanese Patent No. 48-160960 to Nakano discloses a method for storing copying actions such as paper jams in a copier such stored data being displayed at the time of inspection or repair through the use of a service switch.

Additionally, page 3 and pages 24-25 of Section 5 of a Xerox Software Release document on the Xerox 1090 machine (Xerox and Xerox 1090 are registered Trademarks of Xerox Corporation), dated 11/09/84 discusses, under the heading "System Crash Diagnostics" certain steps required to display and print out using the machine itself, selected crash data for diagnostic purposes.

In contrast, the present invention provides a system for collecting data in an electrostatographic reproduction machine for analysis at a site remote from the machine, the machine having plural operating components for processing copies and prints, and control software including an operating system adapted to provide instructions and an applications program for operating the components in response to the instructions; the combination of a dynamic memory for storing event data representing certain key machine operating events during operation of the machine; a rigid disk for storing the control software, the disk including an event logger file for storing the event data; means for periodically writing the event data from the dynamic memory to the event logger file on the disk during operation of the machine, the means overwriting at least some of the event data previously written to the event logger file whereby new event data is repeatedly stored in the event logger file on the disk; the disk including a crash logger file for storing the crash data; means for writing a block of crash data including the event data from the dynamic memory to the crash logger file on the disk each time a software crash occurs; a communication channel coupling the disk with the remote site; and data transmission means to access the crash data in the crash logger file on the disk and transmit the crash data to the remote site through the communication channel.

DETAILED DESCRIPTION OF THE DRAWINGS

For a better understanding of the present invention, reference may be had to the accompanying drawings in which.

DETAILED DESCRIPTION OF THE PREFERRED EMBODIMENT

Figure 1:
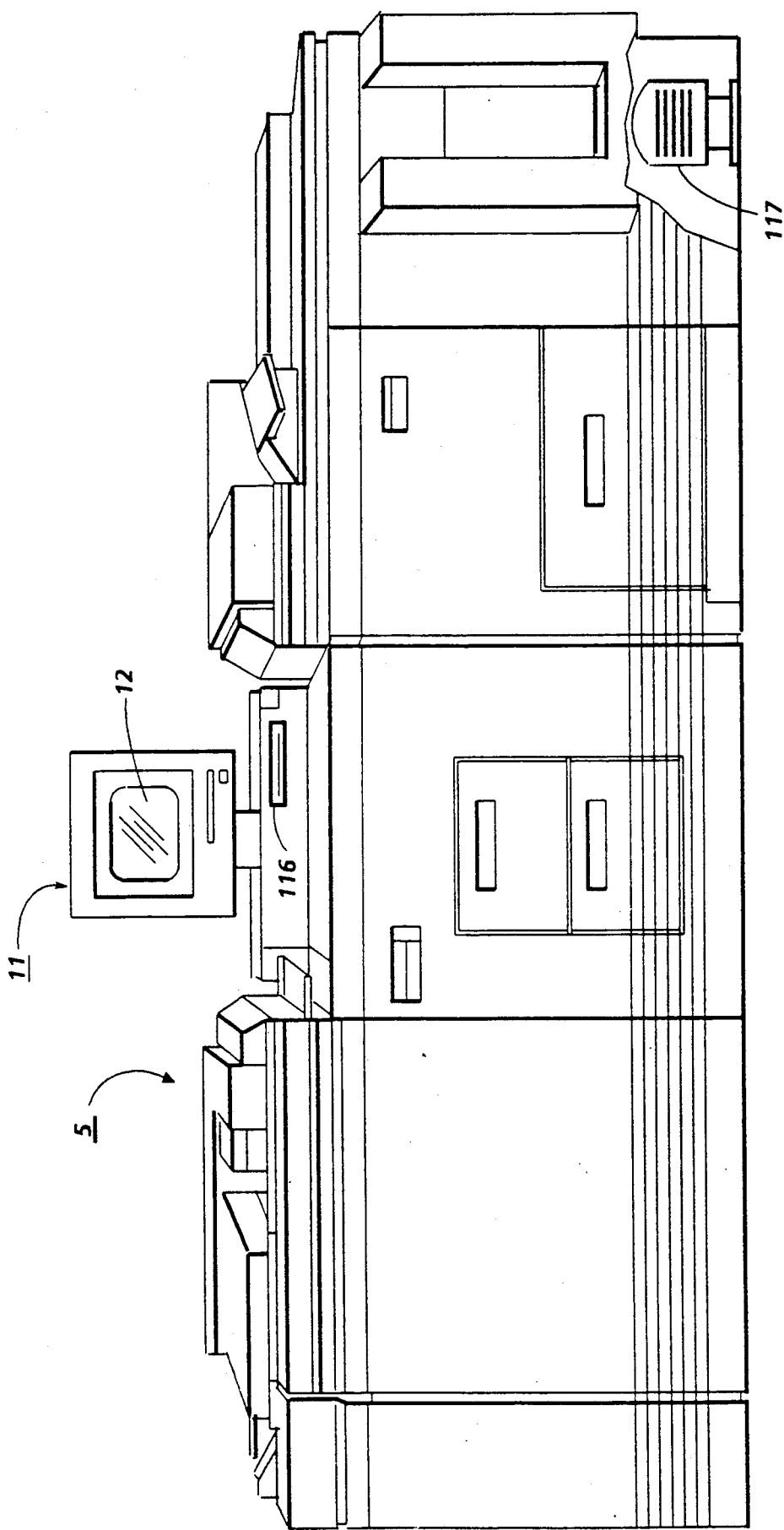
FIG. 1 is an isometric view of an illustrative reproduction machine of the type adapted to use the data collection and transmitting system of the present invention.
Figure 2:
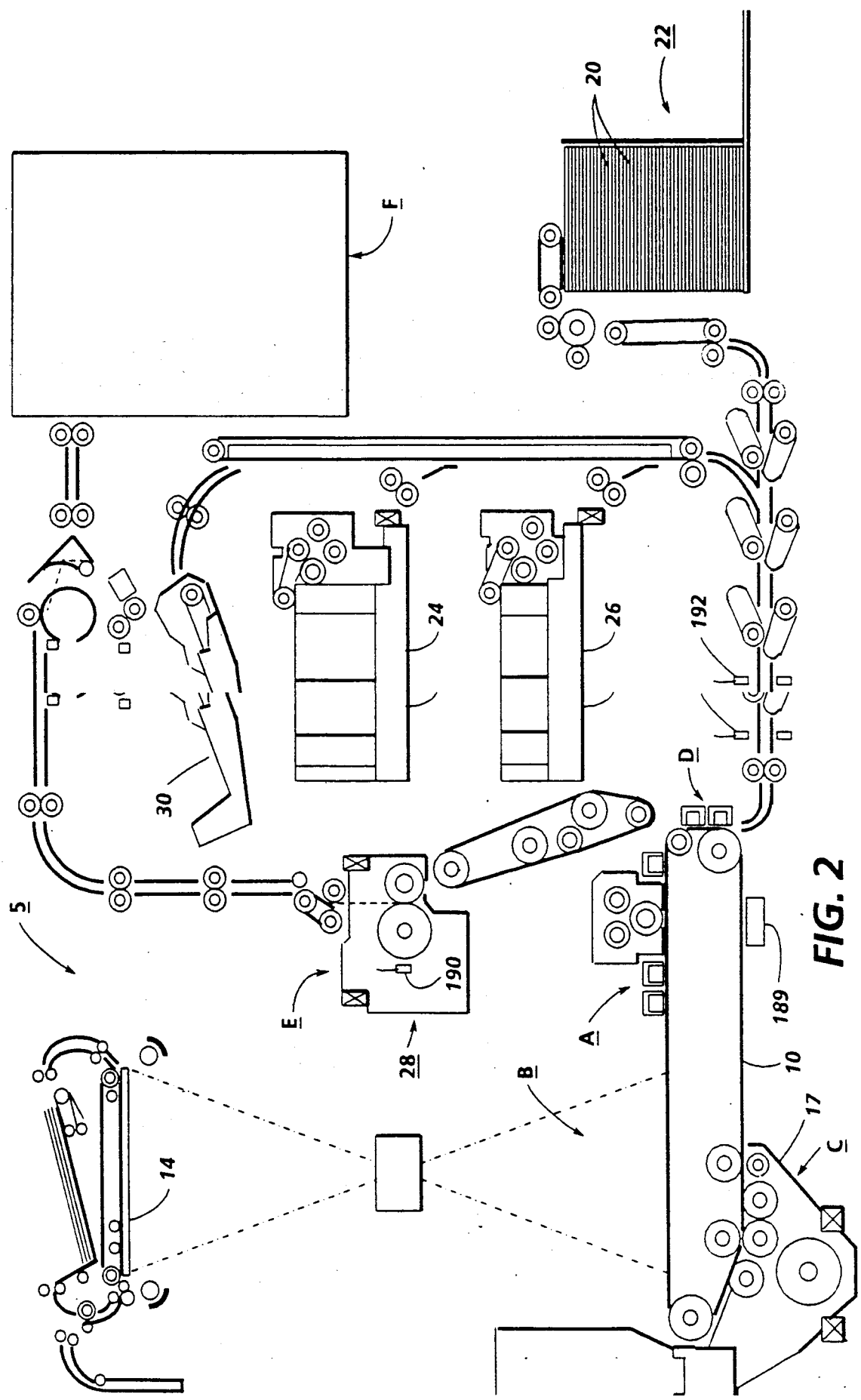
FIG. 2 is a schematic elevational view depicting various operating components and sub-systems of the machine shown in FIG. 1.

For a general understanding of the features of the present invention, reference is made to the drawings. In the drawings, like reference numerals have been used throughout to identify identical elements. Referring to FIGS. 1 and 2, there is shown an electrophotographic reproduction machine 5 composed of a plurality of programmable components and sub-systems which co-operate to carry out the copying or printing job programmed through a touch dialogue screen 12 of a User Interface (U.I.) 11.

Machine 5 has a photoreceptor in the form of a movable photoconductive belt 10 which is charged at charging station A to a relatively high, substantially uniform potential. Next, the charged photoconductive belt is advanced through imaging station B where light rays reflected from the document being copied on platen 14 create an electrostatic latent image on photoconductive belt 10.

The electrostatic latent image is developed at development station C by a magnetic brush developer unit 17 and the developed image transferred at transfer station D to a copy sheet 20 supplied from tray 22, 24, or 26. Following transfer, the copy sheet bearing the transferred image is fed to fusing station E where a fuser 28 permanently affixes the toner powder image to the copy sheet. After fusing, the copy sheets are fed to either finishing station F or to duplex tray 30 from where the sheets are fed back to transfer station D for transfer of the second toner powder image to the opposed sides of the copy sheets.

Figure 3:
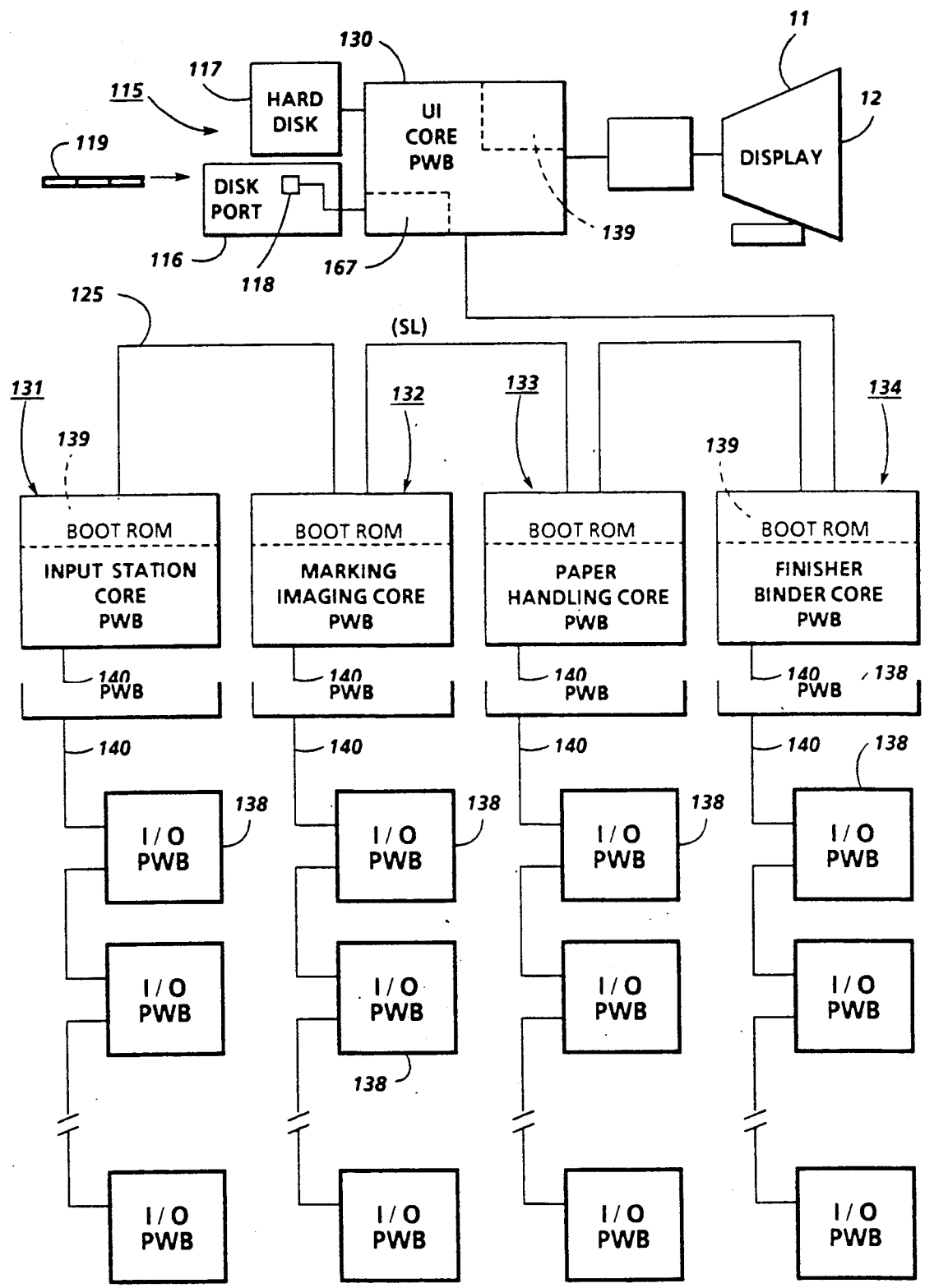
FIG. 3 is a more detailed block diagram depicting the machine Operating System Printed Wiring Boards and shared line connections together with the machine memory and floppy disk port.

Referring to FIG. 3, operation of the various components of machine 5 is regulated by a control system which uses operating software stored in memory 115 to operate the various machine components in an integrated fashion to produce copies and prints. The control system includes a plurality of printed wiring boards (PWBs), there being a UI core PWB 130, an Input Station core PWB 131, a Marking Imaging core PWB 132, a Paper Handling core PWB 133, and a Finisher Binder core PWB 134 together with various Input/Output (I/O) PWBs 138. A Shared Line (SL) 125 couples the core PWBs 130, 131, 132, 133, 134 with each other and with memory 115 while local buses 140 serve to couple the I/O PWBs 138 with each other and with their associated core PWB. Programming and operating control over machine 5 is accomplished through touch dialogue screen 12 of UI 11. The operating software includes applications software 150 (seen in FIG. 4) for implementing and coordinating operation of the machine components.

Memory 115 includes a main memory in the form of a hard or rigid disk 117 on which the machine operating software is stored. On machine power up, the operating software is loaded from memory 115 to UI core PWB 130 and from there to the remaining core PWBs 131, 132, 133, 134 via SL 125. Disk 117 preferably comprises two platter, four head disks with a formatted storage capacity of approximately 20 megabytes. Additional ROM, RAM, and NVM memory types are resident at various locations within machine 5, with each core PWB 130, 131, 132, 134 having a boot ROM 139 for controlling downloading of operating software software to the PWB, fault detection, etc. A NVM 167 is provided in UI core PWB 130. Boot ROMs 139 also enable transmission of operating software and control data to and from PWBs 130, 131, 132, 134 via SL 125 and control data to and from I/O PWBs 138 via local buses 140.

A floppy disk port 116 provides program loading access to memory 115 for the purpose of entering changes to the operating software, loading specific programs such as diagnostic programs, retrieving stored data such as machine faults, etc. using floppy disks 119. Port 116 includes a suitable read/write head 118 for reading and/or writing from and to a disk 119 in port 116. Floppy disks 119 preferably comprise 3.5 inch, dual sided micro disks with a formatted storage capacity of approximately 720 kilobytes.

Referring to FIGS. 4-7 and the "HiLogSpoolerImple.sequel" software routines of Appendix A (Copyright ©1988, Xerox Corporation. All rights reserved), certain key machine operating events (referred to as current event data) which define the proper execution of the control system such as user interface buttons being set, changes in application software operating states, interlock switches opening and closing, notification of control or system faults, execution of key routines, etc., are input as they occur by the applications system software 150 through occurrence logger software to dynamic memory 155. Memory 155, which is Random Access Memory or RAM type memory, provides a circular buffer 156 of predetermined size for storing current event data.

A data transfer means in the form of an event spooling routine in software, which is periodically called, writes the current event data accumulated in buffer 156 of RAM 155 via a suitable pre-filter 169 into an event or occurrence logger file 158 on disk 117. Typically, the event spooling routine is repeated on a given cycle, i.e., after a preset number of machine pitches. When called, the event spooling routine overwrites a portion of the previous event data stored in the event logger file 158 with the current event data, effectively erasing the previously oldest portion of the event data and replacing it with the newer current event data.

Pre-filter 169 serves to selectively discard certain portions of the event data, the retention of which in event logger file 158 is not desired. As will be understood, where it is desired to store all of the event data in file 158, pre-filter 169 may be dispensed with.

In the event it is desired to access the event data in event logger file 158, as for example when servicing machine 10, a floppy disk 119 may be inserted into the disk drive 116 and event logger file 158 accessed to write the event data in file 158 on disk 119. Disk 119 may then be taken to a service site 157 having a suitable computer such as a personal computer (PC) 159 with floppy disk reader 160 and printer 162. Site 157 may be either a co-location with machine 10 or a remote location. PC 159 has conventional software for converting the byte type event data to ASCII data to enable printout by printer 162 onto hard copy for study and analysis as when diagnosing, servicing, repairing, etc. machine 10. Alternately, or in addition, the event data may be displayed on the CRT screen 163 of PC 159.

As will be understood, software crashes may occur from time to time during the life of machine 10. In the case of most crashes, recovery is made either automatically or through the intervention of the operator, and machine 10 continues to operate normally. However, it is desirable to provide a record of the machine state at the time of the crash for use in diagnosing, servicing, etc. machine 10.

Figure 6:
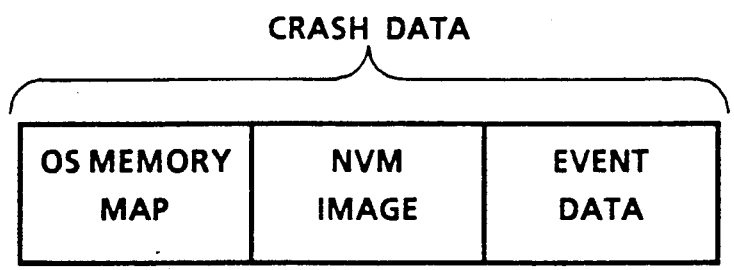
FIG. 6 is a view showing the composition of a typical crash data file.
Figure 7:
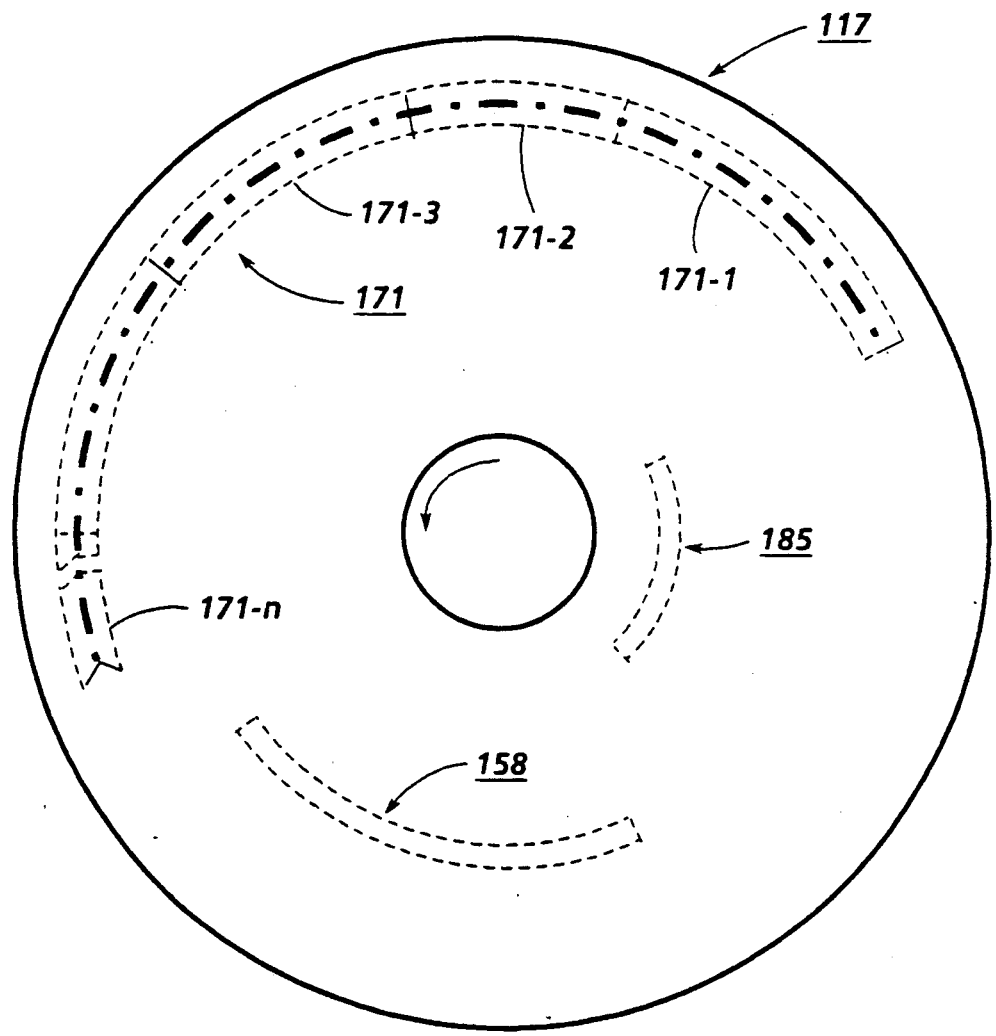
FIG. 7 is an enlarged view of hard disk depicting circular queues of event, crash, and machine physical data files.

Referring to FIGS. 4-7 and the "CrashRetrieval" software routines of Appendix B (Copyright ©1987, 1988, 1989, Xerox Corporation. All rights reserved), on each software crash, a snapshot is in effect taken of certain predetermined events (termed crash data) in machine 10 at the time the crash occurs. As shown in FIG. 6, these events may, for example, consist of an image of each of the operating software (os) memory maps in PWBs 131-134 and boot ROMs 139, and an image of NVM 167. Preferably, a snapshot of the current event data in buffer 156 of RAM 155 is included. The block of crash data obtained is fitted into one of a number of memory areas reserved for crash files 170-1, 170-2, ... 170-n in a crash logger file 171 on disk 117. Crash logger file 171 is a circular queue of crash files 170-1, 170-2, ... 170-n, with the crash data from each succeeding crash written to the crash files 170-1, 170-2, ... 170-n in sequence, starting with the first crash file 170-1 in crash logger file 171. After the last crash file 170-n is written into, the crash data from the next crash is overwritten into the first crash file 170-1 in crash logger file 171, erasing the previous crash data and storing the new crash data in its place. Crash data from subsequent crashes is similarly overwritten into successive ones of the crash files. Each crash file 170-1, 170-2, ... 170-n is assigned a unique number (i.e., 1,2, ... n, n+1, n+2, ... n+n) so that when the crash files on disk 117 are later accessed, the identity of any crash file or files which have been lost due to overwriting of the file contents by subsequent crash data can be identified.

As described earlier in connection with the event logger file 158 on disk 117, crash logger file 171 and the files 170-1, 170-2, ... 170-n therein can be accessed by using floppy disk 119, with the contents of the disk displayed for visual inspection by means of PC 159 or printed out as by means of printer 162.

Figure 4:
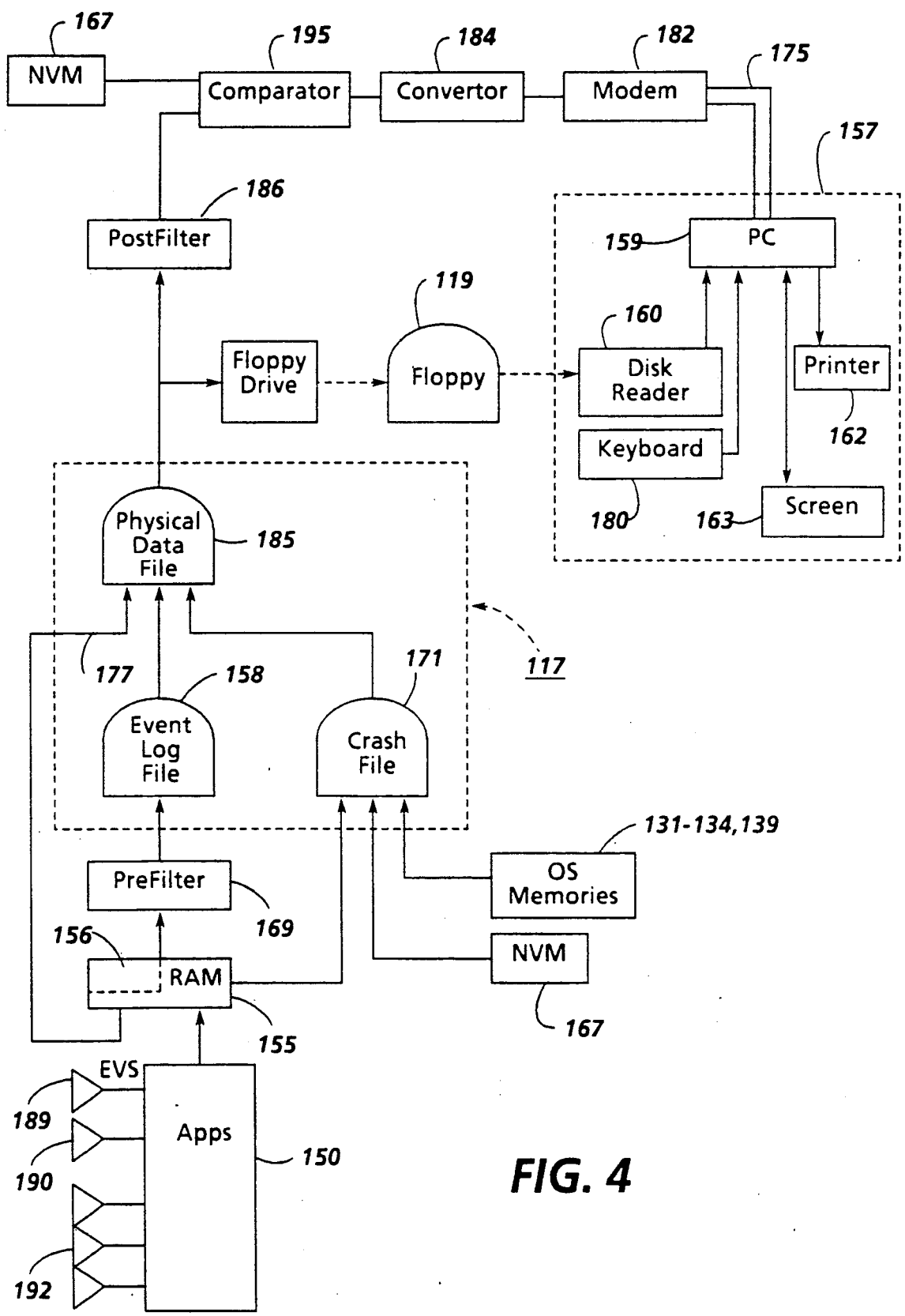
FIG. 4 is a block diagram depicting the data collection system of the present invention in which certain machine event data, crash data, and physical data are collected for optional transmittal to a remote site, either by way of floppy disk or through a communication channel.
Figure 5:
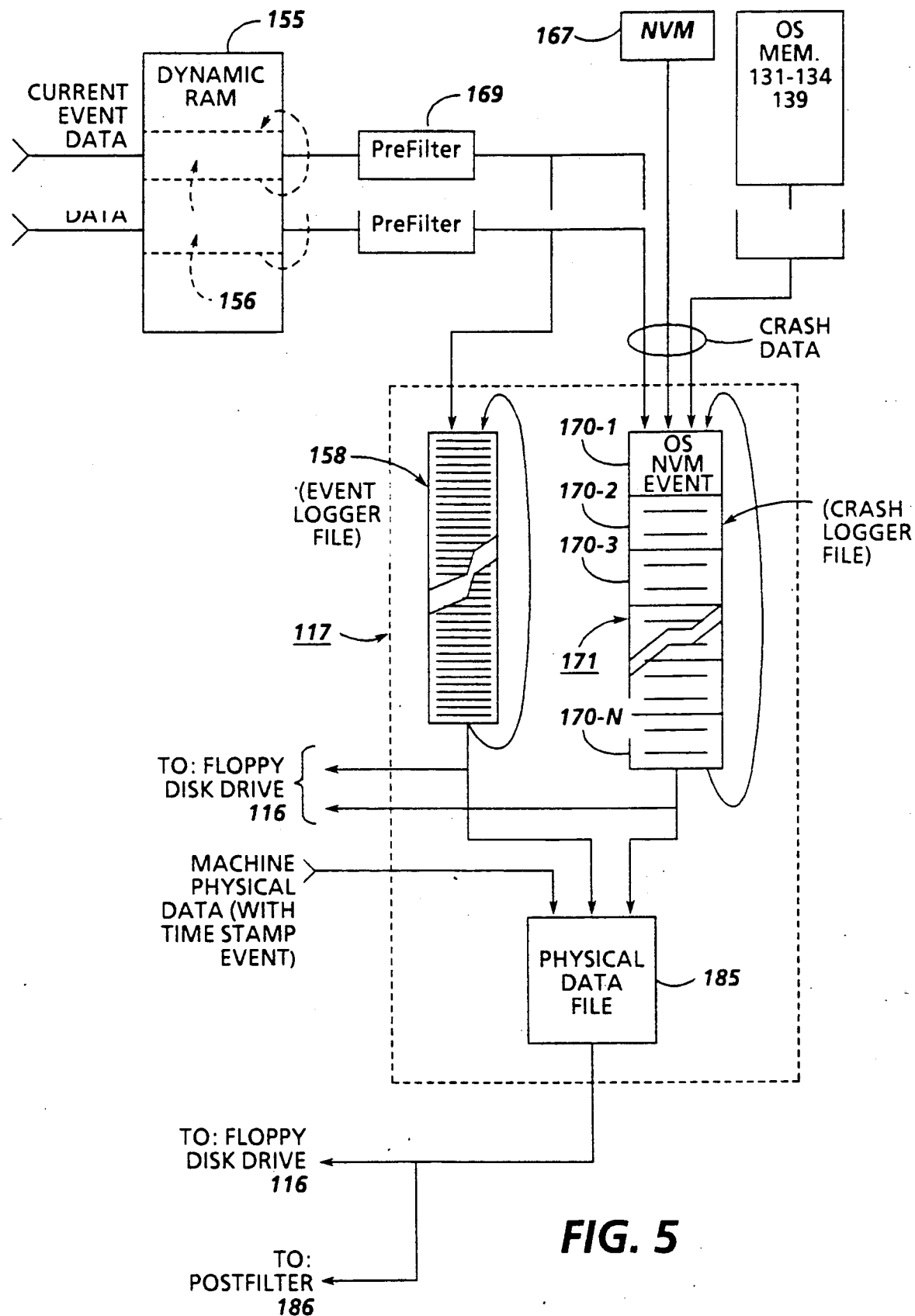
FIG. 5 is a block diagram showing details of the event and crash logger files and the machine physical data file.

Referring to FIG. 4 and the RIC Utility Implement Sequel (RICUtilImpl.Sequel) software routines of Appendix C (Copyright ©1988, 1989, Xerox Corporation. All rights reserved), machine 10 may also employ Remote Interactive Communications (RIC) to enable the transfer of selected machine operating data (referred to as machine physical data) to a remote site such as service site 157 through a suitable communication channel, exemplified here by telephone line 175. The machine physical data may be transmitted to the remote site automatically at predetermined times and/or in response to a specific request from the remote site.

A communication modem 182 is provided for machine 10 at the machine site, modem 182 serving to connect line 175 to machine 10 for transmittal of the machine physical data from machine 10 to the site 157. A computer such as PC 159 with suitable input such as keyboard 180 is provided at the remote site 157 for use in establishing communication with modem 182 for transmission of data from machine 10 via line 175 to site 157. A suitable data bandwidth converter 184 converts the machine data to the clock rate required for transmission over line 175, it being understood that the rate at which data is handled by machine 10 is ordinarily different and typically substantially greater than the data transmission rate of telephone line 175.

The machine physical data to be transmitted, which may include some or all of the event data in event logger file 158 and/or the crash data from crash logger file 171, is obtained from time to time during operation of machine 10 and stored in a physical data file 185 on disk 117.

Certain machine operating parameters such as photoreceptor belt charge levels, fuser temperatures, etc. are permanently stored in NVM 167. These parameters represent the optimum or ideal operational settings for the machine which will result in the best possible machine performance. Typically, these operating parameters provide an operating range or window. Suitable sensors (seen also in FIG. 2) such as an Electrostatic Voltmeter (ESV) 189 for sensing photoreceptor charge levels, temperature sensor 190 for sensing the operating temperatures of fuser 28, sheet jam detectors 192 for detecting sheet jams and determining sheet timing, etc. monitor actual machine operating conditions. At discrete times during the operating cycles of machine 10, the sensors such as ESV 189, temperature sensor 190, jam detectors 192, etc. are read and the data obtained input via line 177 to the machine physical data file 186 for transmission via line 175 to the remote site. Preferably, at regular intervals, a time stamp event is inserted with the data to identify the time when the event occurred.

Since the data transmission bandwidth is limited and transmission cost is relatively high, it is desirable to limit or control the amount of machine physical data transmitted. For this, a suitable post-filter 186 is provided. Filter 186 serves to selectively discard certain portions of the machine physical data and thereby limit the amount of data to be transferred via line 175 to only that which is deemed necessary.

Additionally, it may be prudent to first determine if transmission of some or all of the machine physical data to the remote site is needed. For example where machine 10 is currently operating within the settings specified by the operating parameters stored in NVM 167, there may be no reason to transmit that part of the physical data.

For this purpose, a suitable comparator 195 is provided in software which, in response to a request for transmission of machine physical data from physical data file 185 to the remote site, first compares the data with the data representing the ideal machine operating parameters from NVM 167. Where the comparison indicates that current machine operating conditions are within acceptable limits, transmission of some or all of the physical data may be avoided. In that circumstance, a message indicating that machine 10 is operating properly may instead be transmitted to the remote site.

Where the comparison indicates that one or more of the current operating parameters is out of range, the part of the physical data relating to the problem may be transmitted. Alternately, in that event, all of the physical data may be transmitted.

While the invention has been described with reference to the structure disclosed, it is not confined to the details set forth, but is intended to cover such modifications or changes as may come within the scope of the following claims.

APPENDIX A

-- File: HILogSpoolerImpl.sequel

-- Copyright (C) 1988 by Xerox Corporation. All rights reserved.

```
HILogSpoolerPrologue: PUBLIC PROCEDURE [] RETURNS [BOOLEAN] =
ENTER
 IF PrintEnabled THEN
   -- DEBUG
   PRINT['\nHILogSpoolerPrologue'];
 END IF;

-- read the pattern file Log Entry pointer
 OS.ReadOffPage[PatternPage, RECAST[LogPointerAddr],
       RECAST[@LogEntryAddr], RECAST[NORMALSize]];

-- Read the Log Entry into local storage
 OS.ReadOffPage[PatternPage, RECAST[LogEntryAddr],
       RECAST[@LogPatternEntry], RECAST[LogPatternEntrySize]];

-- determine if the occurance logger is installed
 IF LogPatternEntry.PatternByte < > 16#9A THEN
   RETURN[FALSE];
 END IF;

-- read the data log header into local storage
 OS.ReadOffPage[RECAST[LogPatternEntry.PageAddr],
       RECAST[LogPatternEntry.BufferAddr],
       RECAST[@LogBufferHeader],
       RECAST[LogBufferHeaderSize]];

-- compute the size of a half block
 HalfBlkLen ← (LogPatternEntry.BlockLen)/2;

-- compute the startingaddress of the storage buffer
 FirstUPPERAddr ← LogPatternEntry.BufferAddr;

-- compute the centerpoint on the buffer
 FirstLOWERAddr ← LogPatternEntry.BufferAddr + (HalfBlkLen*256);

IF LogBufferHeader.SpoolPattern < > PatternPattern THEN    -- first startup
   -- initialize the current block to .UPPER
   LogBufferHeader.CurrentHalf ← .UPPER;
```

```
-- write back the CurrentHalf to the header without upsetting other states
OS.WriteOffPage[RECAST[@LogBufferHeader.CurrentHalf],
    RECAST[LogPatternEntry.PageAddr],
    RECAST[RECAST[LogPatternEntry.BufferAddr,NORMAL
CARDINAL] + CurrentHalfOffset],
    RECAST[BlkTypeSize]];

-- set the pattern bytes so we know next initialization is not the first
LogBufferHeader.SpoolPattern ← PatternPattern;

-- write back the SpoolPattern to the header without upsetting other states
OS.WriteOffPage[RECAST[@LogBufferHeader.SpoolPattern],
    RECAST[LogPatternEntry.PageAddr],
    RECAST[RECAST[LogPatternEntry.BufferAddr,NORMAL
CARDINAL] + SpoolPatternOffset],
    RECAST[NORMALSize]];

END IF; -- otherwise don't do anything

-- open the MSS Device
OpenSpoolDevice[];

RETURN[TRUE];

END PROCEDURE HILogSpoolerPrologue;

OpenSpoolDevice:   PROCEDURE [] = tmpPtr: UNSPECIFIED;

ENTER
 IF PrintEnabled THEN
  -- DEBUG
  PRINT['\nOpenSpoolDevice'];
 END IF;

-- FUNKY stuff here, to reduce local space, get buffer from GetBuffer, do the only
-- read that this system uses, then copy it into local space here, lastly
-- use ClearBuffer to give the space back.
--
[tmpPtr] ← HINew.GetBuffer[ 256 ]; -- get a 256 byte buffer AccessBIGFile[      -- read in the header block into "far" storage
    .read,
    SpoolHeaderBlkLen,
    SpoolHeaderBlkIndex,
    HIPage,
    RECAST[tmpPtr]];

WriteOffBIGPage[
    RECAST[tmpPtr],
    HIPage,
    RECAST[@SpoolHeader],
    SpoolHeaderSize];

HINew.ClearBuffer[ tmpPtr ]; -- give the buffer back

IF SpoolHeader.HeaderPattern < > PatternPattern THEN      -- uninitialized header?
    InitSpoolDevice[];                  -- yes, then init it
```

END IF;

END PROCEDURE OpenSpoolDevice;

-- initialize the spool header to empty, all LogBufferHeader entries are valid by now
InitSpoolDevice: PROCEDURE [] =

ENTER
 IF PrintEnabled THEN
  -- DEBUG
  PRINT['\nInitSpoolDevice'];
 END IF;

-- reset the block pointers
  SpoolHeader.HeaderPattern ← PatternPattern;    -- initialize the header pattern
  SpoolHeader.HeadBlockPtr ← FirstSpoolBlk;    -- point head to first block
  SpoolHeader.TailBlockPtr ← FirstSpoolBlk;    -- point tail to first block
  SpoolHeader.BlockLength ← FileBlkLen;    -- indicate the length of the file
  SpoolHeader.FragmentValid ← FALSE;    -- no fragment available
  SpoolHeader.FragmentLen ← 0;    -- no fragment
  SpoolHeader.FirstBlkType ← LogBufferHeader.CurrentHalf;
        -- indicates the first block in file is
        -- an UPPER or LOWER block
        -- could reinit disk with good log buf
  SpoolHeader.SpoolIntegrity ← 0;    -- initially no half lost
  SpoolHeader.UPPERBlkLen ← HalfBlkLen;    -- UPPER blk length
  SpoolHeader.UPPERFirstDataByte ← LogBufferHeaderSize;
        -- first byte of data in UPPER
  SpoolHeader.LOWERBlkLen ← HalfBlkLen;    -- UPPER blk length
  SpoolHeader.LOWERFirstDataByte ← 0;    -- first byte of data in LOWER
  SpoolHeader.FileMapSize ← FileMapSize;    -- len of the file map
  SpoolHeader.FileMapEntries ← numOfMapEntries;    -- number of record entries -- copy the filemap into the SpoolHeader local buffer
 WriteOffBIGPage[
    RECAST[@FileMap],
    HIPage,
    RECAST[@SpoolHeader.FileMap],
    FileMapSize];

-- rewrite the header with the reset header data
 AccessBIGFile[
    .write,
    SpoolHeaderBlkLen,
    SpoolHeaderBlkIndex,
    HIPage,
    RECAST[@SpoolHeader]];
END PROCEDURE InitSpoolDevice;

HILogSpooler: PUBLIC PROCESS [] =

OverFlow:   BOOLEAN;
 FragCounter: NORMAL CARDINAL;

ENTER
 IF PrintEnabled THEN
  -- DEBUG
  PRINT['\nData Log Spooler Ver. 2.70 started.'];
 END IF;

```
IF PeriodDumpFrag THEN         -- DUMP fragments
  FOREVER LOOP
    FOR FragCounter ← 1 UPTO FragmentDumpCount LOOP    -- check for
overflow FragmentDumpCount times

[OverFlow] ← DataOverMidPoint[];
      IF OverFlow THEN
       IF PrintEnabled THEN
         -- DEBUG
         PRINT['\nDumping ring buffer...'];
       END IF;
        DumpRingBufferHalf[];
       ELSE
        IF PrintEnabled THEN
          -- DEBUG
          PRINT['\nNot dumping ring buffer...'];
        END IF;
       END IF;
       WAIT DumpCheckDelay SEC;

END LOOP;
    DumpFragment[];              -- then dump a fragment
   END LOOP;
  ELSE                 -- don't DUMP fragments
   FOREVER LOOP

[OverFlow] ← DataOverMidPoint[];
     IF OverFlow THEN
      IF PrintEnabled THEN
        -- DEBUG
        PRINT['\nDumping ring buffer...'];
      END IF;
       DumpRingBufferHalf[];
      ELSE
       IF PrintEnabled THEN
         -- DEBUG
         PRINT['\nNot dumping ring buffer...'];
       END IF;
      END IF;
      WAIT DumpCheckDelay SEC;

END LOOP;

END IF;

END PROCESS HILogSpooler;

DumpFragment:      PROCEDURE [] =

FirstByteAddr:    NORMAL CARDINAL;

ENTER
 IF PrintEnabled THEN
   -- DEBUG
   PRINT['\nDumpFragment'];
 END IF;

-- select the proper length of fragment
 SELECT LogBufferHeader.CurrentHalf FROM
   CASE .UPPER:
```

```
    SpoolHeader.FragmentLen ← LogBufferHeader.HeadPtr - FirstUPPERAddr;
    FirstByteAddr ← FirstUPPERAddr;
   CASE .LOWER:
    SpoolHeader.FragmentLen ← LogBufferHeader.HeadPtr - FirstLOWERAddr;
    FirstByteAddr ← FirstLOWERAddr;
   OTHERWISE:
    IF PrintEnabled THEN
      -- DEBUG
      PRINT['\nCurrentHalf is invalid in DumpRingBuffer:
LogBufferHeader.CurrentHalf];
    END IF;
    RETURN;
 END SELECT;

SpoolHeader.FragmentValid ← TRUE; '     -- indicate the fragment is valid

-- dump the buffer half buffer to the disk
 AccessBIGFile[
        .write,                  -- write operation
        HalfBlkLen,              -- size of log buf half in blocks
        SpoolHeader.HeadBlockPtr,   -- next available block in spool file
        RECAST[LogPatternEntry.PageAddr],   -- page of log buf
        RECAST[FirstByteAddr]];     -- addr of first byte in .UPPER -- don't update the head/tail pointer
 -- don't adjust head blk pointer
 -- don't toggle CurrentBlk in log buffer -- update CurrentHalf in the spool file header
 AccessBIGFile[
        .write,
        SpoolHeaderBlkLen,
        SpoolHeaderBlkIndex,
        HIPage,
        RECAST[@SpoolHeader]];

END PROCEDURE DumpFragment;

DataOverMidPoint:   PROCEDURE [] RETURNS [BOOLEAN] =

OverRunOccurred:    BOOLEAN;

ENTER
 IF PrintEnabled THEN
   -- DEBUG
   PRINT['\nDataOverMidPoint'];
 END IF;

-- read the data log header
 OS.ReadOffPage[RECAST[LogPatternEntry.PageAddr],
        RECAST[LogPatternEntry.BufferAddr],
        RECAST[@LogBufferHeader],
        RECAST[LogBufferHeaderSize]];

[OverRunOccurred] ← DetectOverrun[LogBufferHeader.CurrentHalf];
 IF OverRunOccurred THEN
   -- increment the overrun counter
   SpoolHeader.SpoolIntegrity ← SpoolHeader.SpoolIntegrity + 1;
```

```
-- update SpoolIntegrity in the spool file header
  AccessBIGFile[
      .write,
      SpoolHeaderBlkLen,
      SpoolHeaderBlkIndex,
      HIPage,
      RECAST[@SpoolHeader]];
END IF;

SELECT LogBufferHeader.CurrentHalf FROM
  CASE .UPPER:
    IF LogBufferHeader.HeadPtr > = FirstLOWERAddr THEN -- into .LOWER half?
      RETURN[TRUE];
    END IF;
  CASE .LOWER:
    IF LogBufferHeader.HeadPtr < FirstLOWERAddr THEN -- into .UPPER half?
      RETURN [TRUE];
    END IF;
  OTHERWISE:
    IF PrintEnabled THEN
      -- DEBUG
      PRINT['\nCurrentHalf is invalid in DataOverMidPoint:
          LogBufferHeader.CurrentHalf];
    END IF;
END SELECT;

RETURN[FALSE]; -- not into next half

END PROCEDURE DataOverMidPoint;

DetectOverrun:    PROCEDURE [Half: BlkType] RETURNS [BOOLEAN] =
ENTER

SELECT Half FROM
    CASE .UPPER:
      IF LogBufferHeader.WrapCounter > = 1 THEN
        RETURN [TRUE];
      END IF;
    CASE .LOWER:
      IF (LogBufferHeader.WrapCounter > = 2) OR
        ((LogBufferHeader.WrapCounter = 1) AND (LogBufferHeader.HeadPtr > =
FirstLOWERAddr)) THEN
        RETURN [TRUE];
      END IF;
    OTHERWISE:
      IF PrintEnabled THEN
        -- DEBUG
        PRINT['\nCurrentHalf is invalid in DataOverMidPoint:
            LogBufferHeader.CurrentHalf];
      END IF;
  END SELECT;
  RETURN [FALSE]; -- otherwise no overrun occurred END PROCEDURE DetectOverrun;

DumpRingBufferHalf: PROCEDURE [] =

FirstByteAddr: NORMAL CARDINAL;
```

```
ENTER
 IF PrintEnabled THEN
  -- DEBUG
  PRINT['\nDumpRingBuffer'];
 END IF;

SELECT LogBufferHeader.CurrentHalf FROM
  CASE .UPPER:
   FirstByteAddr ← FirstUPPERAddr;
  CASE .LOWER:
   FirstByteAddr ← FirstLOWERAddr;
  OTHERWISE:
   IF PrintEnabled THEN
    -- DEBUG
    PRINT['\nCurrentHalf is invalid in DumpRingBuffer:
LogBufferHeader.CurrentHalf];
   END IF;
   RETURN;
 END SELECT;

-- dump the buffer half buffer to the disk
 AccessBIGFile[
     .write,              -- write operation
     HalfBlkLen,          -- size of log buf half in blocks
     SpoolHeader.HeadBlockPtr,   -- next available block in spool file
     RECAST[LogPatternEntry.PageAddr],  -- page of log buf
     RECAST[FirstByteAddr]];     -- addr of first byte in .UPPER -- push the head pointer ahead
 [SpoolHeader.HeadBlockPtr] ← NextHalfSlot[SpoolHeader.HeadBlockPtr];

-- push the tail ahead if its where the head is
 IF SpoolHeader.HeadBlockPtr = SpoolHeader.TailBlockPtr THEN
  [SpoolHeader.TailBlockPtr] ← NextHalfSlot[SpoolHeader.TailBlockPtr];
 END IF;

-- toggle CurrentBlk in log buffer
 SELECT LogBufferHeader.CurrentHalf FROM
  CASE .UPPER:
   LogBufferHeader.CurrentHalf ← .LOWER;
  CASE .LOWER:
   LogBufferHeader.CurrentHalf ← .UPPER;
 END SELECT;

-- write new CurrentHalf into log buf header
 OS.WriteOffPage[
     RECAST[@LogBufferHeader.CurrentHalf],
     RECAST[LogPatternEntry.PageAddr],
     RECAST[RECAST[LogPatternEntry.BufferAddr,NORMAL
CARDINAL] + CurrentHalfOffset],
     RECAST[BlkTypeSize]];

-- any previously written fragment is no longer valid
 SpoolHeader.FragmentValid ← FALSE;

-- clear the DOS wrap counter for overrun detect
 LogBufferHeader.WrapCounter ← 0;
 OS.WriteOffPage[
     RECAST[@LogBufferHeader.WrapCounter],
     RECAST[LogPatternEntry.PageAddr],
```

```
        RECAST[RECAST[LogPatternEntry.BufferAddr,NORMAL
CARDINAL] + WrapCounterOffset],
        RECAST[SHORTSize]];

-- update CurrentHalf, HeadBlockPtr, and TailBlockPtr in the spool file header
    AccessBIGFile[
        .write,
        SpoolHeaderBlkLen,
        SpoolHeaderBlkIndex,
        HIPage,
        RECAST[@SpoolHeader]];

END PROCEDURE DumpRingBufferHalf;

NextHalfSlot:     PROCEDURE [Ptr: NORMAL CARDINAL]
        RETURNS [NORMAL CARDINAL] =
ENTER
 -- update the head/tail pointer
 Ptr ← Ptr + HalfBlkLen;

-- adjust head blk pointer if needed (be sure next half block will fit)

IF (Ptr + HalfBlkLen) > SpoolHeader.BlockLength THEN      -- will next half block fit?
    Ptr ← FirstSpoolBlk;                    -- no, then roll over
 END IF;
 RETURN [Ptr];

END PROCEDURE NextHalfSlot;

-- READ/WRITE BIG file handlers
AccessBIGFile: PROCEDURE [
    option:      HIRigidDisk.diskAccessType,  -- access type
    noOfBlocks:  SHORT CARDINAL,          -- blk length to read/write
    startIndex:  NORMAL CARDINAL,         -- starting index in BIG file
    Page:        Env.PageId,              -- Page of source/destination
    Addr:        UNSPECIFIED] =           -- Addr of source/destination mapEntry:        NORMAL CARDINAL;   -- counter for file map index
TrueIndex:       SHORT CARDINAL;    -- true index into chunk
TruenoOfBlocks:  SHORT CARDINAL;    -- true number of block for chunk
BlocksLeft:      SHORT CARDINAL;    -- blocks left in this chunk ENTER
 IF PrintEnabled THEN
  -- DEBUG
  PRINT['\nAccessBIGFile'];
 END IF;

IF (startIndex + noOfBlocks) > FileBlkLen THEN       -- will the block fit?
   IF PrintEnabled THEN
    PRINT['\nAccessBIGFile File Error:'];
    PRINT['\nBlock outside of file. Index = ',startIndex,'# Blocks = ',noOfBlocks];
   END IF;
   RETURN;
 END IF;

mainLoop: FOR mapEntry ← 0 UPTO (numOfMapEntries-1) LOOP      -- scan until entry located
```

```
    IF (startIndex > = FileMap[mapEntry].FirstRecord) AND         -- index in this
chunk?
        (startIndex < (FileMap[mapEntry].ChunkBlkLength +
FileMap[mapEntry].FirstRecord)) THEN WHILE noOfBlocks > 0 LOOP
          TrueIndex ← LSB[(startIndex - FileMap[mapEntry].FirstRecord)]; -- compute the
True Index BlocksLeft ← (FileMap[mapEntry].ChunkBlkLength -TrueIndex);   -- compute
blks left in chunk IF BlocksLeft > = noOfBlocks THEN    -- will the piece fit
            TruenoOfBlocks ← noOfBlocks;       -- yes, then do it all
          ELSE
            TruenoOfBlocks ← BlocksLeft;       -- no, do partial access
          END IF;

noOfBlocks ← noOfBlocks - TruenoOfBlocks;    -- indicate the amount of blks
left to do

[OpStatus] ← HIRigidDisk.LowPriorityDisk[
                option,              -- access type .read/.write
                FileMap[mapEntry].FileID,    -- File Id of chunk containing data
                TruenoOfBlocks,      -- adjusted number of blocks
                TrueIndex,           -- adjusted chunk index
                Page,                -- Page of data
                Addr,                -- Addr of data
                .apps];              -- show file errors -- handle any file errors
          IF OpStatus < > .noError THEN        -- just indicate error occured
            IF PrintEnabled THEN
              PRINT['\nAccessBIGFile File Error occured. OpStatus = ',OpStatus];
            END IF;
          END IF;

IF noOfBlocks > 0 THEN               -- only update counters if needed
            -- update rolling file counters
            mapEntry ← mapEntry + 1;           -- point to next map entry in case more
access needed
            startIndex ← startIndex + TruenoOfBlocks;    -- update start index in case
more writes needed
            Addr ← Addr + (TruenoOfBlocks*256);          -- push ahead the memory
access address
          END IF;

END LOOP;
        EXIT LOOP mainLoop;                    -- quit scanning the file map
      END IF;
    END LOOP mainLoop;

END PROCEDURE AccessBIGFile;

WriteOffBIGPage:PROCEDURE [
        sourceAddr: POINTER TO AnyHIMemory SHORT UNSPECIFIED,
        destPage: Env.PageId,
        destAddr: POINTER TO AnyHIMemory SHORT UNSPECIFIED,
        length:  SHORT CARDINAL] =
```

```
FileBytesLeft:   SHORT CARDINAL;
AddrOffset:      NORMAL CARDINAL;
XferLength:      SHORT CARDINAL;

ENTER
  -- copy the filemap into the SpoolHeader local buffer
  FileBytesLeft ← length;
  AddrOffset ← 0;

WHILE FileBytesLeft > 0 LOOP

IF FileBytesLeft > MaxOffPageLength THEN
      XferLength ← MaxOffPageLength;
    ELSE
      XferLength ← FileBytesLeft;
    END IF;

OS.WriteOffPage[
        RECAST[RECAST[sourceAddr,NORMAL CARDINAL] + AddrOffset],
        destPage,
        RECAST[RECAST[destAddr,NORMAL CARDINAL] + AddrOffset],
        XferLength];
    FileBytesLeft ← FileBytesLeft - XferLength;
    AddrOffset ← AddrOffset + XferLength;

END LOOP;
END PROCEDURE WriteOffBIGPage;
```

APPENDIX B

```
-- Copyright (C) 1987, 1988, 1989 by Xerox Corporation. All rights reserved.

CrashRetrieval     : PUBLIC PROCEDURE[ bNode : SHORT UNSPECIFIED ] =

ENTER
  brokenNode ← bNode;
  occurranceRetrieved ← 0;
  [ buffer ] ← HINew.GetBuffer[ 256 ];
  bufA ← buffer;
  currentOp ← read;
  currentCrashFile ← historyFile;
  block ← 0;
  GoToDisk[];
  crashPat ← RECAST[ buffer ];
  configuration ← RECAST[ RECAST[ buffer, UNSPECIFIED ] + 2 ];
  crashCount ← RECAST[ RECAST[ buffer, UNSPECIFIED ] + 3 ];
  IF ( crashPat↑ = 16#5775 )
  THEN
    crashCount↑ ← crashCount↑ + 1;
    IF ( crashCount↑ = 0 )
```

```
      THEN
        crashCount↑ ← 1;
      END IF;
    ELSE
      crashPat↑ ← 16#5775;
      crashCount↑ ← 1;
    END IF;
    configuration↑ ← 2;
    currentCrashCount ← crashCount↑;
    currentOp ← write;
    GoToDisk[];
    nodesRetrieved ← 0;
    currentCrashFile ← ( ( currentCrashCount - 1 ) MOD 16 ) + historyFile + 1;
    SendCrashData[];
    IF ( brokenNode > 0 )
    THEN
      IF ( brokenNode = 01 )
      THEN
        GetSAN[];
      END IF;
      GetAllBase[];
      GetNVMDevice[];
      GetOccurranceLog[];
    END IF;
    HINew.ClearBuffer[ buffer ];
  END PROCEDURE CrashRetrieval;

-- PROCEDURE : GoToDisk, GetDOSfineCode, SendCrashData

GoToDisk        : PROCEDURE[] =

ENTER
  [ loadStatus ] ← HIRigidDisk.HighPriorityDisk[
    currentOp,              -- option
    currentCrashFile,       -- fileID
    1,                      -- numOfBlocks
    block,                  -- startingIndex
    myPage,                 -- page
    bufA ];                 -- address
  IF ( loadStatus < > 0 )
  THEN HINew.WaitForever[];
  END IF;
END PROCEDURE GoToDisk;

GetDOSfineCode       : PUBLIC PROCEDURE[] = dca         : UNSPECIFIED = 16#ECFF;
  dosCodeAddress : POINTER TO AnyHIMemory SHORT UNSPECIFIED
        = dca;
  fineCode    : SHORT UNSPECIFIED;
  fineCodeAddress : POINTER TO AnyHIMemory SHORT UNSPECIFIED
        = @fineCode;

ENTER
  OS.ReadOffPage[ crashDataPage, dosCodeAddress, fineCodeAddress, 1 ];
  OS.WriteNVMMemory[ fineCodeAddress, @crashArray[ 2 ], 1 ];
END PROCEDURE GetDOSfineCode;

SendCrashData     : PROCEDURE[] =
```

```
  result      : SHORT UNSPECIFIED;
  nvm         : POINTER TO AnyHIMemory SHORT UNSPECIFIED = @result;

ENTER
  OS.ReadNVMMemory[ @crashArray[ 0 ], RECAST[ buffer ], 5 ];
  tAddress2 ← RECAST[ bufA + 5 ];
  tAddress2 ↑ ← currentCrashCount;
  OS.ReadNVMMemory[ @powerUpState, nvm, 1 ];
  buffer ↑ [ 7 ] ← result;
  buffer ↑ [ 8 ] ← RECAST[ nodesRetrieved ];
  buffer ↑ [ 9 ] ← occurranceRetrieved;
  FOR i ← 10 UPTO 255 LOOP
    buffer ↑ [ i ] ← 0;
  END LOOP;
  block ← 0;
  GoToDisk[];
END PROCEDURE SendCrashData;

-- PROCEDURE : GetSAN, BuildABlock

GetSAN         : PROCEDURE[] = startAddress : UNSPECIFIED = 16#0E000;
  address      : UNSPECIFIED;
  temp         : UNSPECIFIED;
  j            : SHORT UNSPECIFIED;

ENTER
  address ← startAddress;
  currentOp ← write;
  WriteBlock : FOR block ← 1 UPTO 32 LOOP
    [ address ] ← BuildABlock[ crashDataPage, address ];
    GoToDisk[];
  END LOOP WriteBlock;
  FOR j ← 0 UPTO 3 LOOP
    FOR i ← 0 UPTO 15 LOOP
      temp ← i * 16;
      OS.ReadNVMMemory[ temp + ( j * 256 ), RECAST[ bufA + temp ], 16 ];
    END LOOP;
    block ← 161 + j;
    GoToDisk[];
  END LOOP;
  nodesRetrieved ← 16#02;
  SendCrashData[];
END PROCEDURE GetSAN;

BuildABlock    : PROCEDURE[
        page : SHORT UNSPECIFIED,
        address : UNSPECIFIED ]
        RETURNS[ UNSPECIFIED ] = temp    : SHORT UNSPECIFIED;
  index   : SHORT UNSPECIFIED;

ENTER
  FOR index ← 0 UPTO 15 LOOP
    temp ← index * 16;
```

```
      OS.ReadOffPage[ page, RECAST[ address ], RECAST[ bufA + temp ], 16 ];
      address ← address + 16;
    END LOOP;
    RETURN[ address ];
  END PROCEDURE BuildABlock;

-- PROCEDURE : GetAllBase

GetAllBase      : PROCEDURE[] = blockMax      : SHORT UNSPECIFIED;
  goToNVM       : SHORT UNSPECIFIED;
  temp          : SHORT UNSPECIFIED;

ENTER
  FOR node ← 2 UPTO 5 LOOP
    IF ( ( brokenNode = 01 ) OR ( brokenNode = node ) )
    THEN
      sourceAddr ← 16#5000;
      blockMax ← 31;
      goToNVM ← 0;
      GetABaseNode[];
      IF ( loadStatus = 0 )
      THEN
        sourceAddr ← 16#7800;
        blockMax ← 3;
        goToNVM ← 161;
        GetABaseNode[];
      END IF;
      WAIT
    END IF;
  END LOOP;
END PROCEDURE GetAllBase;

-- PROCEDURE : GetABaseNode

GetABaseNode    : PROCEDURE[] =

ENTER
  IF ( goToNVM = 0 )
  THEN temp ← 32 * ( node - 1 ) + 1;
  ELSE temp ← 4 * ( node - 1 ) + goToNVM;
  END IF;
  BLOCK
    FOR i ← 0 UPTO blockMax LOOP
      block ← temp + i;
      HISysEvents.crashReturn ↑ ← .clear;
      loadStatus ← 16#0FF;
      START RetrieveBase[];
      DETECT
        CASE ANYTIME HISysEvents.crashReturn ↑ = .set :
          IF ( loadStatus = 16#0FF )
          THEN EXIT BLOCK;
          END IF;
        CASE 5 SEC :
          CANCEL RetrieveBase;
          EXIT BLOCK;
      END DETECT;
```

```
      GoToDisk[];
      sourceAddr ← sourceAddr + maxBytes;
    END LOOP;
    nodesRetrieved ← nodesRetrieved | maskArray[ node ];
    SendCrashData[];
  END BLOCK;
END PROCEDURE GetABaseNode;

-- PROCESS : RetrieveBase

RetrieveBase      : PROCESS[] =

ENTER
  SELECT node FROM
    CASE = 2 : [ loadStatus ] ← ISNDiagDebugTool[
      bootPage,        -- sourcePage
      sourceAddr,      -- sourceAddr
      myPage,          -- destPage
      bufA,            -- destAddr
      maxBytes ];      -- length
    CASE = 3 : [ loadStatus ] ← MINDiagDebugTool[
      bootPage,        -- sourcePage
      sourceAddr,      -- sourceAddr
      myPage,          -- destPage
      bufA,            -- destAddr
      maxBytes ];      -- length
    CASE = 4 : [ loadStatus ] ← PHNDiagDebugTool[
      bootPage,        -- sourcePage
      sourceAddr,      -- sourceAddr
      myPage,          -- destPage
      bufA,            -- destAddr
      maxBytes ];      -- length
    CASE = 5 : [ loadStatus ] ← FBNDiagDebugTool[
      bootPage,        -- sourcePage
      sourceAddr,      -- sourceAddr
      myPage,          -- destPage
      bufA,            -- destAddr
      maxBytes ];      -- length
  END SELECT;
  HISysEvents.crashReturn ↑ ← .set;
END PROCESS RetrieveBase;

-- PROCEDURE : GetNVMDevice, GetOccurranceLog

GetNVMDevice      : PROCEDURE[] = blk         : SHORT UNSPECIFIED;
  index       : SHORT UNSPECIFIED;
  offset      : SHORT UNSPECIFIED;

ENTER
  currentOp ← write;
  FOR blk ← 0 UPTO 7 LOOP
    FOR index ← 0 UPTO 15 LOOP
      offset ← index * 16;
      OS.ReadNVMMemory[ offset + ( blk * 256 ),
        RECAST[ bufA + offset ], 16 ];
```

```
    END LOOP;
    block ← 181 + blk;
    GoToDisk[];
  END LOOP;
  nodesRetrieved ← nodesRetrieved | 01;
  SendCrashData[];
END PROCEDURE GetNVMDevice;

GetOccurranceLog : PROCEDURE[] = oaddress         : UNSPECIFIED = 16#FC12;
  occurranceAddress : POINTER TO AnyHIMemory SHORT UNSPECIFIED
           = oaddress;
  startBlock      : SHORT UNSPECIFIED = 189;
-- Keep next four variables in order
  pattern     : SHORT UNSPECIFIED;
  page        : SHORT UNSPECIFIED;
  address     : UNSPECIFIED;
  totalBlks   : SHORT UNSPECIFIED;
--
  lookUpOffset : POINTER TO AnyHIMemory SHORT UNSPECIFIED;

ENTER
  OS.ReadOffPage[Env.PageId.zero, occurranceAddress, RECAST[@lookUpOffset], 2];
  OS.ReadOffPage[ Env.PageId.zero, lookUpOffset, RECAST[ @pattern ], 5 ];
  totalBlks ← totalBlks + startBlock - 1;
  FOR block ← startBlock UPTO totalBlks LOOP
    [ address ] ← BuildABlock[ page, address ];
    GoToDisk[];
  END LOOP;
  occurranceRetrieved ← 1;
  SendCrashData[];
END PROCEDURE GetOccurranceLog;
```

APPENDIX C

-- File: RICUtilImpl.Sequel

-- Copyright (C) 1988, 1989 by Xerox Corporation. All rights reserved.

-- BRIEF FUNCTIONAL DESCRIPTION
--
-- This module contains several utilities that can be used by RIC processes.
-- Included are the utilities for the Rigid Disk & transferring data to the Host.
USING
INTRANODAL INTERFACES:
 OS[WriteOffPage, WriteNVMMemory, ReadNVMMemory],
 NVM[ALL],
 HI[Disk],
 RicMhdl[RICSpooler, outputInUse, outputBuffer],
 RICInterface[returnCommandType,rejectReason,commandType,confirmationStatus,
     reasonForCallType,ricSessionActive,locationType];
IMPLEMENTING
--

RICInterface[SendMessageToAllOP, TransferRicFile, ReadBlock,
 diskBuffer, SendFullBlock, SendPartialBlock, SetReturnOpcode, ModemInit,
 CommandReject, Complement, FreeOutputBuffer, ricFile, Confirmation,
 DialHost, machineInitiatedPhoneCall, PollResponse, NVMUpdate];

RICUtilImpl : MODULE = diskBuffer: PUBLIC AppsLocalData ARRAY[0..255] OF SHORT UNSPECIFIED;
ricFile: PUBLIC SHORT UNSPECIFIED;
machineInitiatedPhoneCall: PUBLIC BOOLEAN;

--
--                              -- Name: SendMessageToAllOP
-- Calls: IOP message handler
-- Started By: Anyone
-- Input Parameters:
-- Output Parameters: NONE
-- Function: This procedure will print a message to the RAID window and start the
-- RIC message handler so the the data stored in the queue will be
-- sent to the AllOP and then to the host.
--
SendMessageToAllOP: PUBLIC PROCEDURE [size: SHORT UNSPECIFIED, opcode:
RICInterface.returnCommandType] =

ENTER
 RicMhdl.outputInUse ← TRUE;
 IF size < 16#80 THEN
  PRINT ['*'];
  WAIT
 END IF;
 IF (RICInterface.ricSessionActive = TRUE) THEN
  START RicMhdl.RICSpooler[size]; -- Start Message Handler
 END IF;
END PROCEDURE SendMessageToAllOP;

--
--                              -- Name: FreeOutputBuffer
-- Calls: None
-- Started By: Anyone
-- Input Parameters:
-- Output Parameters: NONE
-- Function: This procedure when called will assure that the output buffer
-- has been freed before returning to the calling program.
--
FreeOutputBuffer: PUBLIC PROCEDURE [timeout: SHORT CARDINAL] =
index: CARDINAL;
messagePrinted: BOOLEAN;
ENTER
 IF RicMhdl.outputInUse = TRUE THEN
  index ← 0;
  messagePrinted ← FALSE;
  UNTIL (RicMhdl.outputInUse = FALSE) LOOP
   WAIT
   index ← index + 1;
   IF index = timeout * 4 THEN
    index ← 0;
    IF messagePrinted THEN
     PRINT['.'];

```
    ELSE
       PRINT ['\n','Wait for buffer '];
       messagePrinted ← TRUE;
     END IF;
     WAIT
    END IF;
 END LOOP;
 IF messagePrinted THEN
     PRINT[' buffer free.'];
   END IF;
  END IF;
END PROCEDURE FreeOutputBuffer;

--
--                          -- Name: DialHost
-- Calls: FreeOutputBuffer, SendMessageToAIIOP
-- Started By: DC318 or result from an alarm
-- Input Parameters: reason : RICInterface.reasonForCallType
-- Output Parameters: NONE
-- Function: This PROCEDURE will send the proper commands so that the phone number
-- contained in NVM will be sent to the AIIOP. This procedure also sets the
-- flag machineInitiatedPhoneCall, which is used by the command aiiopStatus
-- to determine that the machine initiated the phone call and therefore is
-- required to logon to the host when the status CONNECTED is received from
-- the AIIOP.
--
DialHost: PUBLIC PROCEDURE [reason: RICInterface.reasonForCallType] =
 temp: ARRAY [0..15] OF SHORT UNSPECIFIED;
 counter: SHORT CARDINAL;
ENTER
 OS.ReadNVMMemory[@NVM.ricReasonForCall, RECAST[@temp[0]], 1];
 IF reason = .preprogrammed THEN
  temp[0] ← temp[0] | 16#08;
 ELSIF reason = .external THEN
  temp[0] ← temp[0] | 16#04;
 ELSIF reason = .billing THEN
  temp[0] ← temp[0] | 16#02;
 ELSIF reason = .alert THEN
  temp[0] ← temp[0] | 16#01;
 END IF;
 OS.WriteNVMMemory[@temp[0], @NVM.ricReasonForCall, 1];

PRINT ['\n',' Call To - '];
 WAIT
 OS.ReadNVMMemory[@NVM.ricHostPhoneNumber, RECAST[@temp], 16];

-- convert to ascii
 FOR counter ← 0 UPTO 14 LOOP
  IF temp[counter] <= 9 THEN
   PRINT [' ', temp[counter]];
   WAIT
   temp[counter] ← temp[counter] + 16#30;
  END IF;
 END LOOP;

RICInterface.ricSessionActive ← TRUE; -- set session flag

FreeOutputBuffer[10];
 RicMhdl.outputBuffer↑[0] ← temp[15]; -- set number of digits
```

```
FOR counter ← 1 UPTO 15 LOOP
  RicMhdl.outputBuffer↑[counter] ← temp[counter - 1];
END LOOP;

SendMessageToAllOP[16#81,.callRequestFirst];
machineInitiatedPhoneCall ← TRUE;

END PROCEDURE DialHost;

--
--                          -- Name: Complement
-- Calls: None
-- Started By: Anyone
-- Input Parameters: Size, Address Pointer
-- Output Parameters: None
-- Function: This procedure will 2's complement the data pointed to by Addr and
-- will place the corrected value in the original location
--
Complement: PUBLIC PROCEDURE [size: SHORT UNSPECIFIED, Addr: POINTER TO
ARRAY[0..15] OF SHORT LOGICAL] = cardinalArray: ARRAY[0..15] OF SHORT CARDINAL;
index: SHORT CARDINAL;

ENTER
-- complement and move data into Temporary Store
FOR index ← 0 UPTO (size - 1) LOOP
  cardinalArray[index] ← RECAST[(˜(Addr↑[index]))];
END LOOP;

-- add 1 for 2's complement
FOR index ← (size - 1) DOWNTO 0 LOOP
  cardinalArray[index] ← cardinalArray[index] + 1;
  IF cardinalArray[index] < > 0 THEN EXIT LOOP; END IF;
END LOOP;

-- return data to address
FOR index ← 0 UPTO (size - 1) LOOP
  Addr↑[index] ← RECAST[cardinalArray[index]];
END LOOP;

END PROCEDURE Complement;

--
--                          -- Name: SetReturnOpcode
-- Calls: NONE
-- Started By: Anyone
-- Input Parameters: Command Opcode to be returned
-- Output Parameters: NONE
-- Function: This Procedure will validate that the buffer is free and then place
-- the command opcode in the first byte.
--
SetReturnOpcode: PUBLIC PROCEDURE [commandToBeReturned:
RICInterface.returnCommandType] =
index: SHORT CARDINAL;
ENTER
```

```
FreeOutputBuffer[8]; -- 2 Seconds
RicMhdl.outputBuffer ↑ [0] ← commandToBeReturned;
RicMhdl.outputInUse ← TRUE;
END PROCEDURE SetReturnOpcode;

--
                              -- Name: CommandReject
-- Calls:
-- Started By: Anyone
-- Input Parameters: Reason,Command Rejected,Parm#,Data
-- Output Parameters: NONE
-- Function: This procedure will print a message to the RAID window and start the
-- RIC message handler so the the data stored in the data space will be
-- sent to the AIIOP.
--
CommandReject: PUBLIC PROCEDURE [reason: RICInterface.rejectReason,
         rejectedCommandOpcode: RICInterface.commandType,
         parameterNumber: SHORT CARDINAL,
         data: ARRAY[0..3] OF SHORT UNSPECIFIED] =
ENTER SetReturnOpcode[.commandReject];
RicMhdl.outputBuffer ↑ [1] ← reason;
RicMhdl.outputBuffer ↑ [2] ← rejectedCommandOpcode;
RicMhdl.outputBuffer ↑ [3] ← parameterNumber;
RicMhdl.outputBuffer ↑ [4] ← data[0];
RicMhdl.outputBuffer ↑ [5] ← data[1];
RicMhdl.outputBuffer ↑ [6] ← data[2];
RicMhdl.outputBuffer ↑ [7] ← data[3];
SendMessageToAIIOP[7,.commandReject];

END PROCEDURE CommandReject;

--
                              -- Name: Confirmation
-- Calls: None
-- Started By: RIC PROCESS whenever a command is received
-- Input Parameters: inputBufferIndex : SHORT UNSPECIFIED
-- Output Parameters: SHORT UNSPECIFIED - Opcode containted in buffer
-- Function:This procedure will return a generic complete confirmation command
-- to the RIC HOST - this command must be updated to include the passing
-- of error parameters.
--
Confirmation: PUBLIC PROCEDURE [Status: RICInterface.confirmationStatus] =
 confirmationData: AppsCode ARRAY[0..6] OF SHORT UNSPECIFIED ←
[16#89,16#00,16#00,16#00,16#00,16#00,16#00];
 counter: SHORT CARDINAL;
ENTER
 FOR counter ← 0 UPTO 6 LOOP
   RicMhdl.outputBuffer ↑ [counter] ← confirmationData[counter];
 END LOOP;
 RicMhdl.outputBuffer ↑ [3] ← Status;
 SendMessageToAIIOP[ 7,.confirmation]; -- Send message to AIIOP;
 PRINT ['\n','Confirmation Returned','\n'];

END PROCEDURE Confirmation;

--
```

```
--                           -- Name: PollResponse-
-- Calls: None
-- Started By: RIC PROCESS whenever a poll command is received
-- Input Parameters: None
-- Output Parameters: None
-- Function:This procedure will return a generic poll Response command
-- to the RIC HOST
--
PollResponse: PUBLIC PROCEDURE [] =
ENTER
 SetReturnOpcode[.pollResponse];
 SendMessageToAllOP[ 1,.pollResponse]; -- Send message to AllOP;
 PRINT ['\n','Poll Response Returned'];
 WAIT 100 MS;
END PROCEDURE PollResponse;

--                           -- Name: ReadBlock
-- Calls: HI.Disk
-- Called By: Anyone
-- Input Parameters: fileId, blockNumber
-- Output Parameters: NONE
-- Function: This procedure will place the requested data into the Disk Buffer
--
ReadBlock: PUBLIC PROCEDURE [fileId: CARDINAL, blockNumber:SHORT
CARDINAL] =

ENTER
 HI.Disk[.read, fileId, 1, blockNumber, .thirteen, RECAST[@diskBuffer[0]]];
END PROCEDURE ReadBlock;
--

-- Name: SendPartialBlock
-- Calls: ReadBlock, OS.WriteOffPage
-- Called By: TransferRicFile
-- Input Parameters: fileId, blockNumber
-- Output Parameters: NONE
-- Function: This procedure will transfer the requested data in the Disk Buffer
-- to the AllOP.
--

SendPartialBlock: PUBLIC PROCEDURE [fileId: CARDINAL, blockNumber:SHORT
CARDINAL, startOffset:SHORT CARDINAL, endOffset:SHORT CARDINAL] = pCounter: SHORT CARDINAL;
packetCounter: SHORT CARDINAL;
index: SHORT CARDINAL;
address: CARDINAL;
temp: SHORT CARDINAL;
outputIndex: SHORT CARDINAL;
currentOffset: SHORT CARDINAL;
size: SHORT CARDINAL;

startOffsetCardinal: CARDINAL;
endOffsetCardinal: CARDINAL;
currentOffsetCardinal: CARDINAL;

ENTER
ReadBlock[fileId,blockNumber];
```

```
startOffsetCardinal ← CARDINAL[startOffset];
currentOffsetCardinal ← CARDINAL[startOffset];
endOffsetCardinal ← CARDINAL[endOffset];

IF ((endOffsetCardinal + 1) - startOffsetCardinal) < = 117 THEN

FreeOutputBuffer[20];

-- place header into output buffer
  RicMhdl.outputBuffer ↑ [0] ←
ORD[RICInterface.returnCommandType.sendMemory];    -- opcode -- must be able to determine source from fileId
  RicMhdl.outputBuffer ↑ [1] ← ricFile; -- source address ← (blockNumber * 256) + startOffset;
  RicMhdl.outputBuffer ↑ [2] ← 0;      -- address page
  RicMhdl.outputBuffer ↑ [3] ← 0;      -- address Not used
  temp ← MSB[address];             -- address
  RicMhdl.outputBuffer ↑ [4] ← temp;  -- address
  temp ← LSB[address];             -- address
  RicMhdl.outputBuffer ↑ [5] ← temp;  -- address
  RicMhdl.outputBuffer ↑ [6] ← SHORT[((endOffsetCardinal + 1) -
startOffsetCardinal)];  -- length IF ((endOffsetCardinal + 1) - startOffsetCardinal ) < .= 32 THEN
    size ← SHORT[((endOffsetCardinal + 1) - startOffsetCardinal)];
    OS.WriteOffPage[@diskBuffer[startOffset], .thirteen,
RECAST[@RicMhdl.outputBuffer ↑ [7]], size];
  ELSIF ((((endOffsetCardinal + 1) - startOffsetCardinal) > 32) AND
(((endOffsetCardinal + 1) - startOffsetCardinal) < = 64)) THEN
    OS.WriteOffPage[@diskBuffer[startOffset], .thirteen,
RECAST[@RicMhdl.outputBuffer ↑ [7]], 32];
    size ← SHORT[(((endOffsetCardinal + 1) - startOffsetCardinal) - 32)];
    OS.WriteOffPage[@diskBuffer[startOffset + 32], .thirteen,
RECAST[@RicMhdl.outputBuffer ↑ [39]], size];
  ELSIF ((((endOffsetCardinal + 1) - startOffsetCardinal) > 64) AND
(((endOffsetCardinal + 1) - startOffsetCardinal) < = 96)) THEN
    OS.WriteOffPage[@diskBuffer[startOffset], .thirteen,
RECAST[@RicMhdl.outputBuffer ↑ [7]], 32];
    OS.WriteOffPage[@diskBuffer[startOffset + 32], .thirteen,
RECAST[@RicMhdl.outputBuffer ↑ [39]], 32];
    size ← SHORT[((endOffsetCardinal + 1) - startOffsetCardinal) - 64];
    OS.WriteOffPage[@diskBuffer[startOffset + 64], .thirteen,
RECAST[@RicMhdl.outputBuffer ↑ [71]], size];
  ELSE -- >96 AND < = 117
    OS.WriteOffPage[@diskBuffer[startOffset], .thirteen,
RECAST[@RicMhdl.outputBuffer ↑ [7]], 32];
    OS.WriteOffPage[@diskBuffer[startOffset + 32], .thirteen,
RECAST[@RicMhdl.outputBuffer ↑ [39]], 32];
    OS.WriteOffPage[@diskBuffer[startOffset + 64], .thirteen,
RECAST[@RicMhdl.outputBuffer ↑ [71]], 32];
    size ← SHORT[(((endOffsetCardinal + 1) - startOffsetCardinal)) - 96];
    OS.WriteOffPage[@diskBuffer[startOffset + 96], .thirteen,
RECAST[@RicMhdl.outputBuffer ↑ [103]], size];
  END IF;
```

```
-- Send Message
 size ← SHORT[(((endOffsetCardinal + 1) - startOffsetCardinal) + 7)];
 SendMessageToAllOP[size,.sendMemory];

ELSE -- >117 bytes of data
 currentOffsetCardinal ← startOffsetCardinal;
 currentOffset ← SHORT[currentOffsetCardinal];

UNTIL (((endOffsetCardinal + 1) - currentOffsetCardinal) = 0) LOOP

FreeOutputBuffer[20];

-- place header into output buffer
   RicMhdl.outputBuffer ↑ [0] ←
ORD[RICInterface.returnCommandType.sendMemory];    -- opcode -- must be able to determine source from fileId
  RicMhdl.outputBuffer ↑ [1] ← ricFile;          -- source
  address ← (blockNumber * 256) + currentOffset;
  RicMhdl.outputBuffer ↑ [2] ← 0;     -- address page
  RicMhdl.outputBuffer ↑ [3] ← 0;     -- address Not used
  temp ← MSB[address];          -- address
  RicMhdl.outputBuffer ↑ [4] ← temp; -- address
  temp ← LSB[address];           -- address
  RicMhdl.outputBuffer ↑ [5] ← temp; -- address IF ((endOffsetCardinal + 1) - currentOffsetCardinal) > = 64 THEN --
   OS.WriteOffPage[@diskBuffer[currentOffset], .thirteen,
RECAST[@RicMhdl.outputBuffer ↑ [7]], 32];
   OS.WriteOffPage[@diskBuffer[currentOffset + 32], .thirteen,
RECAST[@RicMhdl.outputBuffer ↑ [39]],32];
    currentOffset ← currentOffset + 64;
    currentOffsetCardinal ← currentOffsetCardinal + 64;
    RicMhdl.outputBuffer ↑ [6] ← 64;   -- length
    SendMessageToAllOP[71,.sendMemory]; -- Send Message
   ELSE
    IF ((endOffsetCardinal + 1) - currentOffsetCardinal) < = 32 THEN
     size ← SHORT[((endOffsetCardinal + 1) - currentOffsetCardinal)];
     OS.WriteOffPage[@diskBuffer[currentOffset], .thirteen,
RECAST[@RicMhdl.outputBuffer ↑ [7]], size];
    ELSE
     OS.WriteOffPage[@diskBuffer[currentOffset], .thirteen,
RECAST[@RicMhdl.outputBuffer ↑ [7]], 32];
     size ← SHORT[(((endOffsetCardinal + 1) - currentOffsetCardinal) - 32)];
     OS.WriteOffPage[@diskBuffer[currentOffset + 32],.thirteen,
RECAST[@RicMhdl.outputBuffer ↑ [39]], size];
    END IF;
    RicMhdl.outputBuffer ↑ [6] ← SHORT[((endOffsetCardinal + 1) -
currentOffsetCardinal)];  -- length
    size ← SHORT[(((endOffsetCardinal + 1) - currentOffsetCardinal) + 7)];
    SendMessageToAllOP[size,.sendMemory]; -- Send Message
    currentOffsetCardinal ← endOffsetCardinal + 1; -- this forces the end of the
UNTIL loop
   END IF;
  END LOOP;
END IF;
END PROCEDURE SendPartialBlock;
--
```

```
-- Name: SendFullBlock
-- Calls: ReadBlock, OS.WriteOffPage
-- Called By: TransferRicFile
-- Input Parameters: fileId, blockNumber
-- Output Parameters: NONE
-- Function: This procedure will transfer the requested data in the Disk Buffer
-- to the AllOP.
--

SendFullBlock: PUBLIC PROCEDURE [fileId: CARDINAL, blockNumber:SHORT
CARDINAL] = packetCounter: SHORT CARDINAL;
index: SHORT CARDINAL;
address: CARDINAL;
temp: SHORT CARDINAL;
outputIndex: SHORT CARDINAL;

ENTER
ReadBlock[fileId,blockNumber];

FOR packetCounter ← 1 UPTO 4 LOOP

FreeOutputBuffer[20];

-- place header into output buffer
  RicMhdl.outputBuffer ↑ [0] ←
ORD[RICInterface.returnCommandType.sendMemory];    -- opcode -- must be able to determine source from fileId
  RicMhdl.outputBuffer ↑ [1] ← ricFile; -- source
  address ← ((blockNumber * 256) + ((packetCounter - 1) * 64));
  RicMhdl.outputBuffer ↑ [2] ← 0;       -- address page
  RicMhdl.outputBuffer ↑ [3] ← 0;       -- address Not used
  temp ← MSB[address];                  -- address
  RicMhdl.outputBuffer ↑ [4] ← temp;    -- address
  temp ← LSB[address];                  -- address
  RicMhdl.outputBuffer ↑ [5] ← temp;    -- address
  RicMhdl.outputBuffer ↑ [6] ← 64;      -- length -- Move 64 bytes to output Buffer
  IF packetCounter = 1 THEN
    OS.WriteOffPage[@diskBuffer[0], .thirteen,
RECAST[@RicMhdl.outputBuffer ↑ [7]], 32];
    OS.WriteOffPage[@diskBuffer[32], .thirteen,
RECAST[@RicMhdl.outputBuffer ↑ [39]],32];
  ELSIF packetCounter = 2 THEN
    OS.WriteOffPage[@diskBuffer[64], .thirteen,
RECAST[@RicMhdl.outputBuffer ↑ [7]], 32];
    OS.WriteOffPage[@diskBuffer[96], .thirteen,
RECAST[@RicMhdl.outputBuffer ↑ [39]],32];
  ELSIF packetCounter = 3 THEN
    OS.WriteOffPage[@diskBuffer[128], .thirteen,
RECAST[@RicMhdl.outputBuffer ↑ [7]], 32];
    OS.WriteOffPage[@diskBuffer[160], .thirteen,
RECAST[@RicMhdl.outputBuffer ↑ [39]],32];
  ELSIF packetCounter = 4 THEN
    OS.WriteOffPage[@diskBuffer[192], .thirteen,
```

```
RECAST[@RicMhdl.outputBuffer ↑ [7]], 32];
  OS.WriteOffPage[@diskBuffer[224], .thirteen,
RECAST[@RicMhdl.outputBuffer ↑ [39]],32];
 ELSE
  PRINT ['\n','error in SendFullBlock'];
 END IF;

-- Send Message
  SendMessageToAllOP[71,.sendMemory];
END LOOP;
END PROCEDURE SendFullBlock;

--
--                              -- Name: TransferRicFile
-- Calls: SendPartialBlock, SendFullBlock
-- Started By: Anyone
-- Input Parameters: fileId, Starting Address, End Address
-- Output Parameters: NONE
-- Function: This procedure will perform the calls necessary to sequentially
-- read blocks from a disk file and have them passed to the AllOP for RIC
-- transmission.
--
TransferRicFile: PUBLIC PROCEDURE [fileId: CARDINAL, startAddr: CARDINAL,
endAddr: CARDINAL] = blockCounter: SHORT CARDINAL;
startOffset: SHORT CARDINAL;
endOffset: SHORT CARDINAL;
firstBlock: SHORT CARDINAL;
lastBlock: SHORT CARDINAL;
temp: CARDINAL;

ENTER
-- Determine first and last byte to be read
firstBlock ← MSB[startAddr]; -- startAddr/256
startOffset ← LSB[startAddr]; -- startAddr MOD 256
lastBlock ← MSB[endAddr]; -- endAddr/256
endOffset ← LSB[endAddr]; -- endAddr/256

IF firstBlock = lastBlock THEN
  SendPartialBlock[fileId,firstBlock,startOffset,endOffset];
ELSE
  SendPartialBlock[fileId,firstBlock,startOffset,255];
  blockCounter ← firstBlock + 1;
  UNTIL blockCounter = lastBlock LOOP
   SendFullBlock[fileId,blockCounter];
   blockCounter ← blockCounter + 1;
  END LOOP;
  SendPartialBlock[fileId,firstBlock,0,endOffset];
END IF;
END PROCEDURE TransferRicFile;

END MODULE RICUtilImpl;
```

We claim:

1. In an electrostatographic reproduction machine with plural operating components; control software including an operating system adapted to provide instructions for operating said components and an applications program for operating said components in response to said instructions, the combination of;
   a) a dynamic memory for storing event data representing certain key machine operating events during operation of said machine;
   b) a rigid disk for storing said control software, said disk including an event logger file for storing event data; and
   c) data transfer means for periodically writing said event data from said dynamic memory to said event logger file on said disk during operation of said machine, said data transfer means overwriting at least some of the event data previously written to said event logger file whereby new event data is periodically written to said event logger file on said disk for storing;
   said rigid disk including a crash logger file having a predetermined number of memory areas for storing blocks of crash data representing predetermined machine events on the occurrence of a software crash, said blocks of crash data including said event data in said dynamic memory;
   said data transfer means writing a block of said crash data to said crash logger file in response to a software crash whereby to save said crash data for use in determining the causes of said crash;
   said data transfer means writing each succeeding block of said crash data into the next successive one of said rigid disk memory areas, said data transfer means overwriting memory areas having previously stored blocks of said crash data starting with the first of said rigid disk memory areas in said crash logger file when the last one of said rigid disk memory areas has been written into;
   each of said blocks of said crash data when written in said crash logger file by said data transfer means including crash identity data to identify each of said blocks of crash data in said crash logger file on erasure of said blocks of crash data;
   said crash identify data being retained in said crash logger file on erasure of the block of crash data associated therewith.

2. A system for collecting and transmitting predetermined physical data of an electrostatographic reproduction machine to a remote site for analyzing machine operation, said machine having plural operating components, control software including operating system software for operating said components, and a hard disk providing memory for storing said control software, the combination of:
   a) means for periodically collecting said physical data on said disk while said machine is operating;
   b) a communication channel coupling said machine to said remote site for transmission of said physical data from said hard disk to said remote site;
   c) data transfer means for transmitting at least some of said physical data from said over said communication channel to said remote site for use in analyzing machine operation;
   d) non-volatile memory means for permanently storing optimum operating parameters for said machine;
   e) comparison means for comparing said physical data on said hard disk with said optimum operating parameters for said machine; and
   f) control means for preventing transmission of said physical data from said hard disk to said remote site where comparison of said physical data on said hard disk and said optimum operating parameters by said comparison means indicates that machine operation is acceptable.

3. The machine according to claim 2 in which said communication channel has a data transmission rate different than the rate at which said physical data are generated; and
   means to convert the data rate of said physical data to the data transmission rate of said communication channel to enable transmission of said physical data over said communication channel to said remote site.

4. The machine according to claim 3 in which said physical data include timing data to identify the time at which the machine event represented by said physical data occured.

5. A system for retaining crash data in the event of a software crash in an electrostatographic reproduction machine having plural operating components; and control software including an operating system to provide instructions for operating said components and an applications program for operating said components in response to said instructions, the combination of:
   a) a rigid disk for storing said machine control software, said disk including a crash logger file;
   b) data transfer means for writing a preset block of crash data including crash block identifying means for identifying each of said blocks of crash data to said crash logger file on said disk in response to a software crash;
   c) said crash logger file having a limited number of memory areas for storing said blocks of crash data;
   d) said data transfer means writing each succeeding block of crash data into the next successive one of said memory areas in said crash logger file;
   e) where the last of said memory areas in said crash logger file is written into, said data transfer means overwriting the next succeeding block of said crash data into the first of said memory areas in said crash logger file thereby erasing said block of previously stored crash data in said first memory area except for the crash block identifying means for said previously stored block of crash data whereby to enable said previously stored block of crash data to be identified.

6. The machine according to claim 5 including access means for remotely accessing said blocks of crash data from said crash logger file.

7. The machine according to claim 6 in which
   a) a dynamic memory for storing event data representing certain key machine operating events during operation of said machine;
   b) said disk including an event logger file for storing said event data;
   c) said data transfer means periodically writing said event data from said dynamic memory to said event logger file on said disk;

said data transfer means overwriting at least some of the event data previously stored in said event logger file whereby fresh event data is repeatedly stored in said event logger file; and d) means responsive to said software crash to access said dynamic memory and combine said event data in said dynamic memory with said block of crash data for storage in said crash logger file on said disk.

8. A process for collecting event and software crash data from an electrostatographic reproduction machine, said machine having control software for operating said machine and rigid disk for storing said control software, comprising the steps of:

a) collecting event data representing preset key machine operating events by
   1a) temporarily storing said event data in memory during operation of said machine, and
   2a) periodically writing said stored event data from said memory to a first file on said rigid disk;

b) reading said stored event data by
   1b) accessing said first file on said rigid disk,
   2b) transferring said event data from said first file on said rigid disk to a floppy disk,
   3b) reading said event data from said floppy disk at a remote site, and
   4b) displaying said event data for visual inspection at said remote site;

c) collecting said crash data on a software crash by
   1c) writing a predetermined block of said crash data including said event data to a second file on said rigid disk,
   2c) writing crash block identifying data at the time said block of crash data is written to said second file, and
   3c) repeating steps 1c and 2c for subsequent software crashes; and d) where said second file is filled,
   1d) writing succeeding blocks of crash data over previous blocks of crash data written to said second file starting with the block of crash data first written to said second file, and
   2d) retaining in said second file the crash block identifying data for each block of said crash data written over whereby to enable each block of crash data written over to be identified.

9. The process according to claim 8 including the step of:

printing said event data from said floppy disk on copy paper for visual inspection.

10. The machine according to claim 1 including:
a) a floppy disk,
b) said machine including a floppy disk port for reading and writing data between said rigid disk and said floppy disk;
c) means to access said event logger file and transfer event data in said event logger file to said floppy disk for remote analysis of said event data at a site separate from said machine; and
d) means for analyzing said event data from said floppy disk at said site including
   1) read means to read said event data on said floppy disk,
   2) conversion means to convert said event data read from said floppy disk to a form enabling said event data to be visually displayed, and
   3) display means for displaying said converted event data for visual inspection.

11. The machine according to claim 10 in which said display means comprises a CRT for displaying said event data for visual inspection.

12. The machine according to claim 10 in which said display means comprises a printer for printing said converted event data onto a copy material for visual inspection.

* * * * *